3,724,998
CONTINUOUS DYEING OF POLYESTER FIBERS WITH WATER IMMISCIBLE ORGANIC SOLVENTS AND HYDROXY-PHENOL AMINO ANTHRAQUINONES
Gunter Gehrke and Volker Hederich, Cologne, Rutger Neeff, Leverkusen, and Peter Wegner, Cologne, Germany, assignors to Farbenfabriken Bayer Aktiengesellschaft, Leverkusen, Germany
No Drawing. Filed Oct. 1, 1970, Ser. No. 77,342
Claims priority, application Germany, Oct. 8, 1969,
P 19 50 679.7
Int. Cl. C09b 1/02; D06p 1/20
U.S. Cl. 8—39
8 Claims

ABSTRACT OF THE DISCLOSURE

The invention comprises a process for the continuous dyeing of synthetic fibre materials, e.g. polyester, polyamides, polyolefins and cellulose triacetate, from organic solvents. The fibre materials are impregnated with dye-liquors which contain anthraquinone dyestuffs of the formula

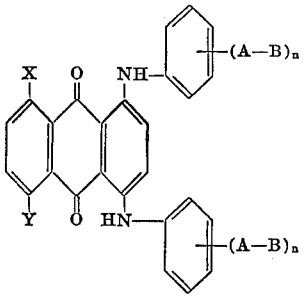

in which A represents a C—C bond or an oxygen atom, B stands for a $C_1$–$C_9$ alkyl, cycloalkyl or aralkyl radical, $n$ is a number from 0 to 3, X denotes a hydrogen atom or a hydroxyl group, and Y stands for a hydrogen atom, a hydroxyl, a nitro, amino or an acylamino group RCONH—, and subsequently subjected to a heat treatment.

---

The present invention relates to a process for the continuous dyeing of synthetic fibre materials from organic solvents; more particularly it concerns a process for the continuous dyeing of synthetic fibre materials from organic solvents wherein the fibre materials are impregnated with dye-liquors which contain anthraquinone dyestuffs of the formula

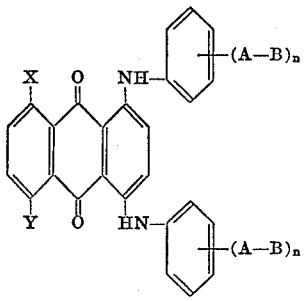

I in which
A represents a C—C bond or an oxygen atom,
B stands for a $C_1$–$C_9$ alkyl, cycloalkyl or aralkyl radical,
$n$ is a number from 0 to 3,
X denotes a hydrogen atom or a hydroxyl group, and Y stands for a hydrogen atom, a hydroxyl, a nitro, amino or an acylamino group RCONH—, and subsequently subjected to a heat treatment.
Examples to be mentioned for B are:

as $C_1$–$C_9$ alkyl radicals the methyl-, ethyl-, propyl-, iso-propyl-, n-butyl-, sec-butyl-, tert.-butyl-, iso-amyl-, sec.-pentyl-, neopentyl-, methyl-pentyl-, dimethyl-butyl-, methyl - hexyl-, dimethyl - pentyl-, trimethyl - butyl-, n-octyl- iso-octyl-, methyl-heptyl-, dimethyl-hexyl-, tri-methyl-pentyl-, tetramethyl-butyl-iso-nonyl, dimethyl-heptyl and the trimethyl-hexyl- radical;
as cycloalkyl radicals the cyclohexyl radical, and as aralkyl radicals particularly the α,α-dimethylbenzyl radical.

In the acylamino group R—CONH—, R preferably stands for a $C_1$–$C_{17}$ alkyl radical, e.g. the methyl-, ethyl-, propyl-, iso-propyl-, n-butyl-, iso-butyl-, tert.-butyl-, iso-amyl-, sec-pentyl-, hexyl-, heptyl-, octyl-, nonyl-, decyl-, undecyl-, tridecyl- pentadecyl- or heptadecyl radical or a phenyl radical which may be substituted by lower alkyl groups, e.g. the phenyl, tolyl or xylyl radical.

The dyestuffs of the Formula I used according to the invention for the dyeing from organic solvents are obtained by known methods. Thus, for example, the dyestuffs of the Formula I in which X and Y stand for hydrogen are obtained from leuco-1,4-dihydroxy- or diamino-anthraquinones by the reaction with arylamines. The dyestuffs of the Formula I in which X and Y represent hydroxyl groups, can be produced from leuco-1,4,5,8-tetrahydroxy-anthraquinones or from 4,8-dihalo-quinizarins with arylamines. Dyestuffs of the Formula I in which X stands for a hydrogen atom and Y for an amino or acylamino group are obtained by the reaction of leuco-5-amino-quinizarins with arylamines, optionally followed by acylation. Dyestuffs of the Formula I in which X stands for a hydroxyl group and Y for a hydrogen atom are obtainable by reacting leuco-,14,5-hydroxy-anthra-quinone with acylamines. Dyestuffs of the Formula I in which X denotes a hydroxyl group and Y a nitro group, can be prepared by reacting 1,8-dihydroxy-4,5-dinitro-anthraquinones with aryl amines in the presence of boric acid. By the reduction of these compounds, optionally followed by acylation, dyestuffs of the Formula I are formed in which X is a hydroxyl group and Y an amino or acylamino group. Furthermore, it is also possible to produce the dyestuffs of the Formula I by reacting halo-benzenes with 1,4-diamino-anthraquinones which are substituted in the 5,8-position by X or Y.

Organic solvents suitable for the process according to the invention are those solvents which are immiscible with water and the boiling points of which range from 40 to 150° C., for example, aromatic hydrocarbons, such as toluene and xylene; halogenated hydrocarbons, particularly aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 1,2-dichloropropane, 1,1,1-trichloropropane, 1-chlorobutane, 2-chlorobutane, 1,4-dichlorobutane, 1-chloro-2-methyl-propane or 2-chloro-2-methyl-propane as well as aliphatic fluorinated or fluo-rochlorinated hydrocarbons, such as perfluoro-n-hexane, 1,2,2 - trifluoro-trichloroethane and 1,1,1-trifluoro-pentachloropropane, and aromatic chlorinated and fluorinated hydrocarbons, such as chlorobenzene, fluorobenzene, chlorotoluene and benzotrifluoride.

Tetrachloroethylene, trichloroethylene and 1,1,1-trichloroethane have proved to be especially suitable. Mixtures of these solvents may also be used.

The synthetic fibre materials to be dyed according to the process of the invention are particularly fibre materials obtained from polyesters, e.g. polyethylene terephthalates, or polyesters obtained from 1,4-bis-(hydroxymethyl)-cyclohexane and terephthalic acid, from cellulose triacetate, from synthetic polyamides, such as poly-ε-caprolactam, polyhexamethylenediamine adipate or poly-ω-amino-undecanic acid, from polyurethanes or polyolefins. The fibre materials may be present in the form of woven and knitted fabrics.

The dyestuffs to be used according to the invention are dissolved for the dyeing in the water-immiscible, organic solvents, or they are added to the latter in the form of solutions in solvents which can be mixed with these solvents to an unlimited extent, such as alcohols, dimethyl formamide, dimethylacetamide, dimethyl sulphoxide or sulpholan, and the synthetic fibre materials are impregnated with the resulting clear dyestuff solutions which may also contain, in order to improve the levelness of the dyeings, the non-ionic still soluble auxiliaries, e.g. the known surface-active ethoxylated and propoxylated products of fatty alcohols, alkylphenols, fatty acid amides and fatty acids. The dyestuffs are subsequently fixed on the fibre materials by a heat treatment. The heat treatment can consist in a brief dry-heat treatment at 120–230° C., an intermediate drying possibly preceding the dry-heat treatment or, alternatively, in a treatment of the fibre materials in a superheated solvent vapour at 100–150° C. Small non-fixed dyestuff portions can be rinsed out by a brief treatment with the cold organic solvent. It may be mentioned that, in some cases, mixtures of the dyestuffs to be used according to the invention can result in a better dye-yield than the dyestuffs by themselves and may exhibit a better solubility in the organic medium.

With the aid of the process according to the invention it is possible, when dyeing is carried out from organic solvents, to obtain on synthetic fibre material dyeings which are distinguished by a high dyestuff yield, very good texture as well as by outstanding fastness properties, particularly very good fastness to thermofixing, washing, rubbing and light. Another advantage of the dyestuffs to be used according to the invention is their ready solubility in organic solvents, especially in tetrachloroethylene, trichloroethylene, 1,1,1-trichloroethane and 1,1,1-trichloropropane, this enabling the dyeing to be carried out without solutes.

The parts given in the following examples are parts by weight.

EXAMPLE 1

A fabric of polyethylene terephthalate fibres is impregnated at room temperature with a clear green solution which contains 10 parts 1,4-bis-(4-n-butylanilino)-5,8-dihydroxyanthraquinone in
990 parts tetrachloroethylene.

After squeezing the fabric to a weight increase of 60%, it is dried at 80° C. for one minute. The dyestuff is subsequently fixed by heating the fabric at 190–220° C. for 45 seconds. The small non-fixed portion of the dyestuff is subsequently washed out by a brief treatment in cold tetrachloroethylene. After drying, a clear yellowish green dyeing is obtained which is characterised by its high dyestuff yield, very good texture as well as outstanding fastness properties, especially very good fastness to thermofixing, washing, rubbing and light.

Equivalent clear green dyeings were obtained in an analogous manner on fabrics of (a) cellulose triacetate,
(b) synthetic polyamides or polyurethanes, and
(c) polypropylene fibres.

However, the thermofixing was carried out for (a) at 200–220° C., for
(b) at 170–200° C., and for
(c) at 120–150° C.

Equivalent dyeings were obtained by replacing the 990 parts tetrachloroethylene by the same amount of one of the following solvents: methylene-chloride, chloroform, carbon tetrachloride, dichloroethane, trichloroethane, trichloroethylene, tetrachloroethane, dichloropropane, 1,1,1-trichloropropane, chlorobutane, dichlorobutane, perfluoro-hexane, 1,2,2-trifluorotrichloroethane and 1,1,1-trifluoro-pentachloropropane.

The dyestuff employed was prepared as follows:

15 parts 5,8-dichloro-quinizarin were heated at 170–175° C. for 6 hours in 100 parts 4-n-butylaniline, in the presence of 8 parts sodium carbonate. After cooling, the reaction mixture was diluted with 100 parts methanol, the crystallised dyestuff was filtered off with suction, washed with methanol and water, and dried. 25 parts of the dyestuff were obtained.

EXAMPLE 2

A knitted fabric of polyhexamethylene-diamine-adipate filaments is impregnated at room temperature with a clear blue solution which contains 10 parts 1,4-bis-(4-methyl-2,6-diethylanilino)-anthraquinone, and
7 parts nonylphenol-heptaethylene glycol ether in
983 parts tetrachloroethylene.

After squeezing the knitted fabric to a weight increase of 60%, it is dried at 80° C. for one minute. The dyestuff is subsequently fixed by heating the knitted fabric at 192° C. for 45 seconds. Small non-fixed dyestuff portions are then washed out by a brief treatment, for about 20 seconds, in cold tetrachloroethylene. After drying, a clear blue dyeing is obtained which is characterised by its high dyestuff yield, very good texture as well as by outstanding fastness properties, especially very good fastness to thermofixing, washing, rubbing and light.

An equivalent clear blue dyeing was likewise obtained in an analogous manner on fabrics of anionically modified polyhexamethylene-diamine-adipate.

An equivalent dyeing was likewise obtained by replacing the 983 parts tetrachloroethylene by the same amount of toluene, xylene, chlorobenzene, dichlorobenzene or 1,2,2-trifluoro-trichloroethane.

The dyestuff employed was prepared as follows:

A mixture of 10 parts quinizarin, 10 parts leuco-quinizarin, 6.8 parts boric acid anhydride, 20 parts glacial acetic acid, 11 parts 1-amino-2,6-diethyl-4-methyl-benzene hydrochloride and 66 parts 1-amino-2,6-diethyl-4-methyl-benzene was heated under reflux to 115° C., while vigorously stirring. The air was displaced by carbonic acid. After completion of the condensation, the melt was transferred into 500 parts water and 100 parts hydrochloric acid, extracted by boiling and filtered off with suction. The dyestuff which, in part, consists of leuco compounds was oxidized in usual manner to give the anthraquinone derivative. It was, for example, heated under reflux, while passing in air, with 500 parts alcohol and 30 parts of a caustic soda solution until a leuco compound was no longer detected. The dyestuff obtained in crystalline form was filtered off with suction, washed with water and dried.

EXAMPLE 3

A fabric of polypropylene fibres is impregnated at room temperature with a clear green solution which contains 10 parts 1,4-di-o-anisidino-5-lauroylamino-8-hydroxy-an and
7 parts nonylphenol-heptaethylene glycol ether in 983 parts tetrachloroethylene.

After squeezing the fabric to a weight increase of 60%, it is dried at 80° C. for one minute. The dyestuff is subsequently fixed by heating the fabric at 140° C. for 30 seconds. Non-fixed dyestuff portions can be washed out by a brief treatment in cold solvent. A clear green dyeing is obtained which is characterized by its high dyestuff yield, very good texture and outstanding fastness properties, particularly very good fastness to thermofixing, washing, rubbing and light.

The dyestuff employed was prepared as follows:

10 parts 1,4-dianilino-5-amino-anthaquinone were mixed in 100 parts pyridine at 20–25° C. with 10 parts isovaleryl chloride. The mixture was diluted after 2 hours with 100 parts water, the dyestuff filtered off with suction and rinsed with water. After drying, 11 parts of the dyestuff were obtained.

EXAMPLE 4

A fabric of poly-1,4-cyclohexane-dimethylene terephthalate is impregnated at room temperature with a clear green solution which contains 10 parts 1,4-dio-anisidino-5-lauroylamino-8-hydroxy-anthraquinone, and 7 parts nonylphenol-heptaethylene glycol ether in 983 parts tetrachloroethylene.

After squeezing the fabric to a weight increase of 60%, it is dried at 80° C. for one minute. The dyestuff is subsequently fixed by heating the fabric for 45 seconds at 190–220° C. The small amount of non-fixed dyestuff is then washed out by a brief treatment in cold tetrachloroethylene. After drying, a clear yellowish green dyeing is obtained which is characterised by its high dyestuff yield, very good texture as well as by outstanding fastness properties, particularly very good fastness to thermofixing, washing, rubbing and light.

A clear yellowish green dyeing is likewise obtained in an analogous manner on anionically modified polyethylene terephthalate filaments.

The dyestuff employed was prepared as follows:

20 parts 1,8-dihydroxy-4,5-dinitro-anthraquinone, 2 parts boric acid and 160 parts 4-tert.-butylaniline were stirred at 150° C. for about 6 hours. After cooling the reaction mixture and diluting it with 200 parts methanol, the precipitate was filtered off with suction, washed with 200 parts methanol and dried. Yield: 25 parts of the dyestuff which was obtained in the form of green, feather-like crystalline needles.

EXAMPLE 5

A fabric of polyethylene terephthalate fibres is impregnated at room temperature with a clear green solution which contains 10 parts 1,4-di-i-anisidino-5-lauroylamino-8-hydroxy-anthraquinone, and 7 parts nonylphenol-heptaethylene glycol ether in 983 parts tetrachloroethylene.

After squeezing the fabric to a weight increase of 60%, it is dried at 80° C. for one minute. The dyestuff is subsequently fixed by heating the fabric at 190–220° C. for 45 seconds. The small non-fixed dyestuff amount is then washed out by a brief rinsing with cold tetrachloroethylene. After drying, a clear yellowish green dyeing is obtained which is characterised by its high dyestuff yield, very good texture as well as by outstanding fastness properties, particularly very good fastness to thermofixing, washing, rubbing and light.

The dyestuff employed was prepared as follows:

10 parts 1,4-di-o-anisidino-5-hydroxy-8-nitro-anthraquinone, obtained in analogy with the production of 1,4-bis-(4-tert.-butylanilino)-5-nitro-8-hydroxy-anthraquinone described in Example 2, were heated under reflux for 1 hour in 100 parts methanol with 5 parts sodium sulphide trihydrate. After cooling, the amino compound was filtered off with suction, washed with water, dissolved in 100 parts pyridine and mixed at 20–25° C. with 10 parts lauric acid chloride. When the acylation, which was observed by chromatography, was completed, the crystallised dyestuff was filtered off with suction and washed with water. After drying, 12 parts of the dyestuff were obtained.

EXAMPLE 6

A fabric of cellulose triacetate fibres is impregnated at room temperature with a clear green solution which contains 10 parts of a dyestuff mixture of 5 parts 1,4-bis-(4-cyclohexylanilino)-anthraquinone, and 5 parts 1,4-bis-(4-tert.-butylanilino)-anthraquinone, and 7 parts nonylphenol-heptaethylene glycol ether in 983 parts tetrachloroethylene.

After squeezing the fabric to a weight increase of 60%, it is dried at 80° C. for one minute. The dyestuff is subsequently fixed by heating the fabric at 215° C. for one minute. A clear green dyeing is obtained which is characterised by a high dyestuff yield, very good texture and outstanding fastness properties, particularly very good fastness to thermofixing, washing, rubbing and light.

When, instead of the dyestuffs mentioned in Examples 1–6, the same amount of one of the dyestuffs set out in the following table was used, there were obtained on fabrics of polyester, triacetate, polyamide, polyurethane or polyolefin fibres dyeing with equivalent fastness properties in the shades specified in the table:

| Example | Dyestuff | Shade |
| --- | --- | --- |
| 7 | 1,4-bis-(4-isobutylanilino)-5,8-dihydroxy-anthraquinone. | Yellowish green. |
| 8 | 1,4-bis-(4-tert.-butylanilino)-5,8-dihydroxy-anthraquinone. | Do. |
| 9 | 1,4-bis-(4-isohexylanilino)-5,8-dihydroxy-anthraquinone. | Do. |
| 10 | 1,4-bis-(2,4-diisopropylanilino)-5,8-dihydroxy-anthraquinone. | Do. |
| 11 | 1,4-bis-(4-isononylanilino)-5,8-dihydroxy-anthraquinone. | Yellowish green. |
| 12 | 1,4-bis-(2,4,5-tri-isopropylanilino)-5,8-dihydroxyanthraquinone. | Green. |
| 13 | 1,4-bis-(4-cyclohexylanilino)-5,8-dihydroxy-anthraquinone. | Yellowish green. |
| 14 | 1,4-bis-(4-cyclohexyl-2-methylanilino)-5,8-dihydroxyanthraquinone. | Do. |
| 15 | 1,4-bis-(4-α,α-dimethylbenzylanilino)-5,8-dihydroxyanthraquinone. | Do. |
| 16 | 1,4-bis-(4-isoamyloxy-anilino)-5,8-dihydroxy-anthraquinone. | Do. |
| 17 | 1,4-bis-(3-isooctyl-anilino)-5,8-dihydroxy-anthraquinone. | Do. |
| 18 | 1,4-bis-(2,4,5-trimethylanilino)-anthraquinone. | Blue-green. |
| 19 | 1,4-bis-(2,6-diethylanilino)-anthraquinone. | Blue. |
| 20 | 1,4-bis-(2,4,5-tri-isopropylanilino)-anthraquinone. | Bluish green. |
| 21 | 1,4-bis-(4-n-butylanilino)-anthraquinone. | Do. |
| 22 | 1,4-bis-(4-iso-octylanilino)-anthraquinone. | Do. |
| 23 | 1,4-bis-(4-cyclohexyl-2-methylanilino)-anthraquinone. | Blue-green. |
| 24 | 1,4-bis-(4-α,α-dimethylbenzylanilino)-anthraquinone. | Bluish green. |
| 25 | 1,4-bis-(3,4-di-isopropoxyanilino)-anthraquinone. | Do. |
| 26 | 1,4-bis-(4-n-butylanilino)-5-nitroanthraquinone. | Green. |
| 27 | 1,4-bis-(4-iso-octyloxyanilino)-5-nitroanthraquinone. | Do. |
| 28 | 1,4-bis-(4-tert.-butylanilino)-5-amino-anthraquinone. | Do. |
| 29 | 1,4-bis-(4-cyclohexylanilino)-5-amino-anthraquinone. | Do. |
| 30 | 1,4-bis-(4-cyclohexyl-2-methylanilino)-5-aminoanthraquinone. | Do. |
| 31 | 1,4-bis-(4-cyclohexylanilino)-5-acetylamino-anthraquinone. | Do. |
| 32 | 1,4-bis-(3-methoxyanilino)-5-stearoylamino-anthraquinone. | Do. |
| 33 | 1,4-bis-(4-iso-octylanilino)-5-(4-methylbenzoylamino)-anthraquinone. | Do. |
| 34 | 1,4-bis-(4-n-butylanilino)-5-benzoylamino-anthraquinone. | Do. |
| 35 | 1,4-bis-(4-cyclohexylanilino)-5-nitro-8-hydroxyanthraquinone. | Yellowish green. |
| 36 | 1,4-bis-(4-iso-octylanilino)-5-nitro-8-hydroxy-anthraquinone. | Do. |
| 37 | 1,4-bis-(2,4,5-tri-isopropylanilino)-5-nitro-8-hydroxyanthraquinone. | Green. |
| 38 | 1,4-bis-(4-cyclohexyl-2-methylanilino)-5-amino-8-hydroxyanthraquinone. | Do. |
| 39 | 1,4-bis-(4-tert.-butylanilino)-5-amino-8-hydroxyanthraquinone. | Do. |
| 40 | 1,4-bis-(3-methylanilino)-5-isovaleryl-amino-8-hydroxyanthraquinone. | Yellowish green. |
| 41 | 1,4-bis-(4-tert.-butylanilino)-5-benzoylamino-8-hydroxyanthraquinone. | Do. |
| 42 | 1,4-bis-(4-cyclohexylanilino)-5-propionyl-amino-8-hydroxyanthraquinone. | Do. |
| 43 | 1,4-bis-(4-n-butylanilino)-5-hydroxy-anthraquinone. | Green. |
| 44 | 1,4-bis-(4-cyclohexylanilino)-5-hydroxy-anthraquinone. | Do. |
| 45 | 1,4-bis-(3,4-di-isopropoxyanilino)-5-hydroxy-anthraquinone. | Do. |

EXAMPLE 46

A fabric of polyethylene terephthalate fibres is impregnated at room temperature with a clear green solution which contains 10 parts 1,4-bis-(4-iso-octylanilino)-5-hydroxy-anthraquinone in
990 parts 1,1,1-trichloroethane.

After squeezing the fabric to a weight increase of 60%, the dyestuff is fixed by heating the fabric with superheated 1,1,1-trichloroethane vapour at 140° C. The small non-fixed dyestuff amount is subsequently washed out by a brief rinsing in cold 1,1,1-trichloroethane. After drying, a clear green dyeing is obtained which is characterised by its high dyestuff yield, very good texture and outstanding fastness properties.

The dyestuff employed was prepared as follows:

100 parts 4-iso-octylamine, 10 parts 1,4,5-trihydroxy-anthraquinone, 5 parts hydrochloric acid and 1 part boric acid were mixed at 90° C. with 0.5 parts zinc dust. The melt was stirred at 90–100° C. until the colour did no longer become more green, then mixed at 60° C. with 100 parts methanol. After cooling to 20° C., the dyestuff was filtered off with suction, washed with methanol and dried. 20 parts of the dyestuff were obtained.

EXAMPLE 47

A fabric of poly-1,4-cyclohexane-dimethylene terephthalate is impregnated at room temperature with a clear green solution which contains 10 parts 1,4-di-m-toluidino-5-amino-anthraquinone in
990 parts tetrachloroethylene.

After squeezing the fabric to a weight increase of 60%, the dyestuff is fixed by treating the fabric for 35 seconds with superheated tetrachloroethylene vapour at 150° C. The small non-fixed dyestuff amount is then washed out by a brief rinsing in cold tetrachloroethylene. After drying, a clear green dyeing is obtained which is characterised by its high dyestuff yield, very good texture as well as by outstanding fastness properties.

The dyestuff employed was prepared as follows:

15 parts 5-aminoquinizarin, 100 parts m-toluidine, 8 parts boric acid and 8.3 parts concentrated hydrochloric acid were mixed at 75° C. with 2 parts zinc dust. The melt was then stirred at 95° C. for 3 hours and, after completion of the reaction, mixed with 15 parts pulverised potassium hydroxide. After oxidising the residual leuco compounds by passing in air, the melt was diluted with 100 parts methanol. The crystallised dyestuff was filtered off with suction at 25° C., washed with methanol and water and then dried.

We claim:
1. Process for the continuous dyeing of polyester synthetic fiber material comprising the steps of
   (A) impregnating the fiber material with a non-aqueous dyeing liquor consisting essentially of an organic solvent and an anthraquinone dyestuff said organic solvent consisting of water-immiscible organic solvent said anthraquinone dyestuff having the formula

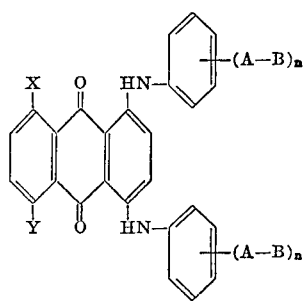

in which
A is a C—C bond or oxygen;
B is a $C_1$–$C_9$ alkyl, cycloalkyl or aralkyl radical;
n is a number from 0 to 3;
X is hydroxyl;
Y is hydroxyl, nitro, amino, or RCONH—; and
R is $C_1$–$C_{17}$ alkyl or phenyl substituted by lower alkyl;
   (B) subjecting the fiber material to a heat treatment to fix said dyestuff.
2. The process of claim 1 in which Y is hydroxyl.
3. The process of claim 1 in which Y is nitro, amino or RCONH—.
4. The process of claim 1 in which said anthraquinone dyestuff is soluble in said water-immiscible organic solvent.
5. The process of claim 1 in which the dyed material is subjected to a subsequent step of (C) rinsing with water-immiscible organic solvent in which said anthraquinone dyestuff is soluble.
6. The process of claim 1 in which said water-immiscible organic solvent is a halogenated hydrocarbon having a boiling point between 40 and 150° C.
7. The process of claim 1 in which said water-immiscible organic solvent is an aliphatic chlorohydrocarbon having a boiling point of between 40 and 150° C.
8. The process of claim 1 in which said water-immiscible organic solvent is selected from the group consisting of tetrachloroethylene, trichloroethylene, 1,1,1-trichloroethane, and mixtures thereof.

References Cited
UNITED STATES PATENTS

| | | | |
|---|---|---|---|
| 2,274,751 | 3/1942 | Sowter et al. | 8—59 |
| 2,586,105 | 2/1952 | Speakman et al. | 28—73 |
| 3,235,322 | 2/1966 | Tanaka et al. | 8—39 |
| 3,390,947 | 7/1968 | Shown et al. | 8—39 |
| 2,226,909 | 12/1940 | Peter | 260—374 |
| 3,510,243 | 5/1970 | Seuret et al. | 8—39 |

FOREIGN PATENTS

| | | | |
|---|---|---|---|
| 1,250,238 | 10/1971 | Great Britain | 8—39 |
| 550,659 | 1/1943 | Great Britain. | |
| 1,217,380 | 12/1970 | Great Britain. | |

GEORGE F. LESMES, Primary Examiner
P. C. IVES, Assistant Examiner

U.S. Cl. X.R.
8—25; 260—378, 380, 373